(No Model.) 2 Sheets—Sheet 1.

R. F. ELLIS.
COMBINED HARROW, SEED PLANTER, AND CULTIVATOR.

No. 278,113. Patented May 22, 1883.

WITNESSES:
Chas Nida
C. Sedgwick

INVENTOR:
R. F. Ellis
BY Munn & Co
ATTORNEYS.

(No Model.) 2 Sheets—Sheet 2.
R. F. ELLIS.
COMBINED HARROW, SEED PLANTER, AND CULTIVATOR.
No. 278,113. Patented May 22, 1883.
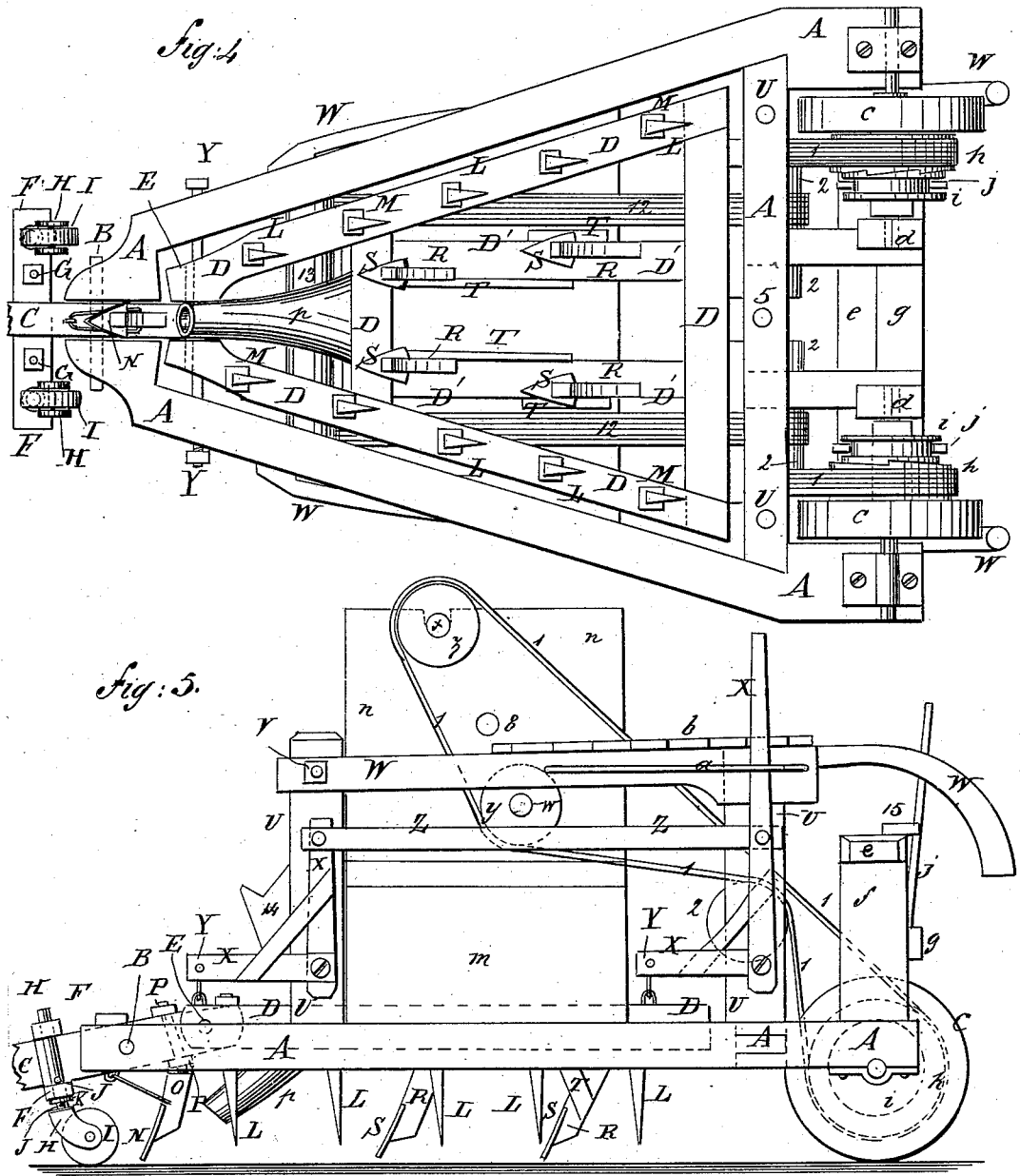
WITNESSES:
INVENTOR:
R. F. Ellis
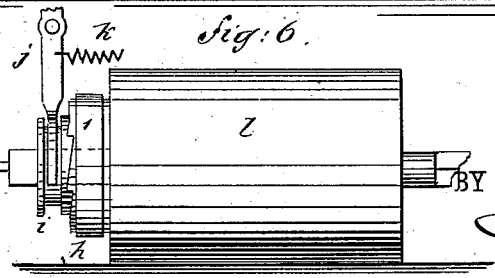
BY
Munn & Co.
ATTORNEYS.
N. PETERS. Photo-Lithographer. Washington, D. C.

UNITED STATES PATENT OFFICE.

ROBERT F. ELLIS, OF WHITT, TEXAS.

COMBINED HARROW, SEED-PLANTER, AND CULTIVATOR.

SPECIFICATION forming part of Letters Patent No. 278,113, dated May 22, 1883.

Application filed August 28, 1882. (No model.)

*To all whom it may concern:*

Be it known that I, ROBERT FULLER ELLIS, of Whitt, in the county of Parker and State of Texas, have invented a new and useful Improvement in a Combined Harrow, Seed-Planter, and Cultivator, of which the following is a full, clear, and exact description.

Reference is to be had to the accompanying drawings, forming part of this specification, in which similar letters of reference indicate corresponding parts in all the figures.

Figure 1:
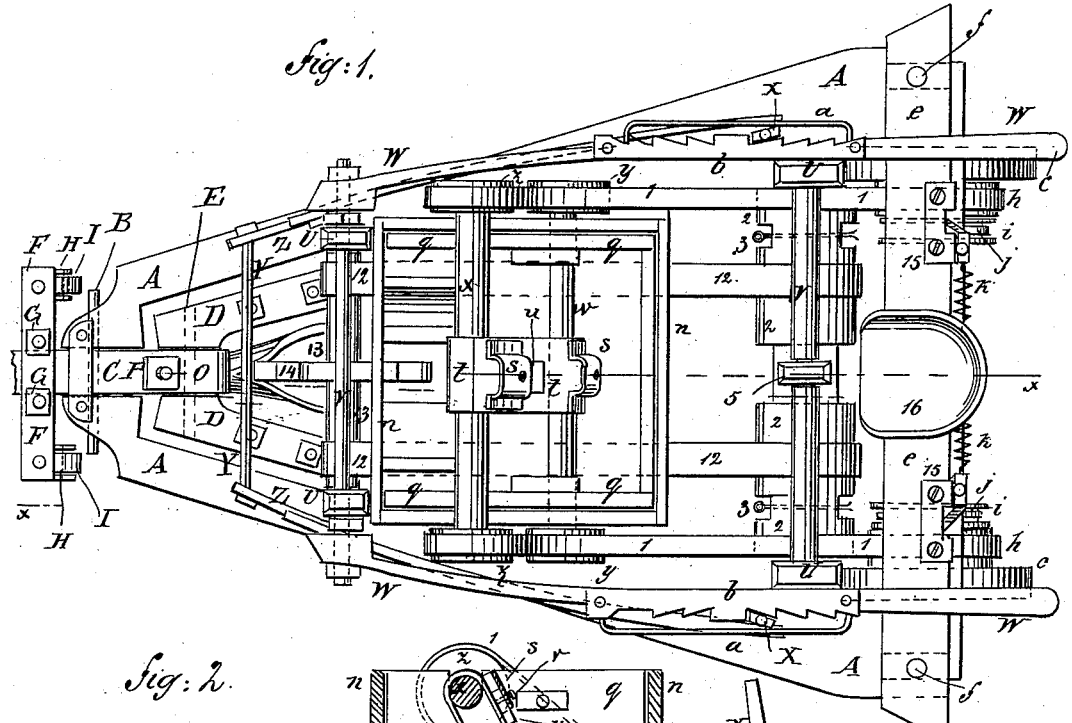
Figure 2:
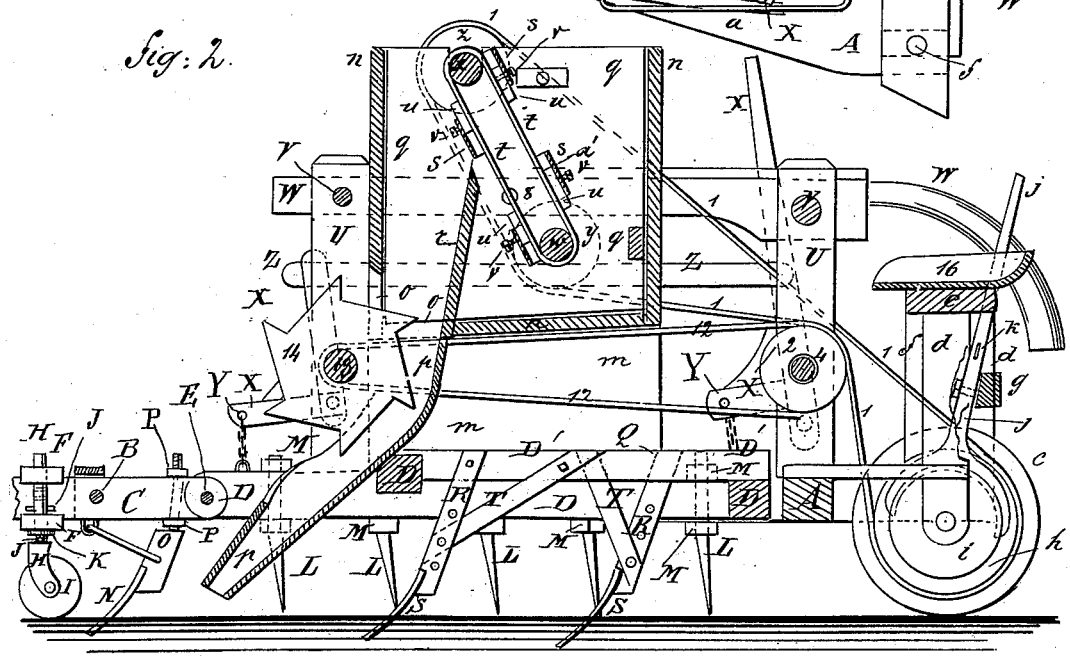
Figure 3:
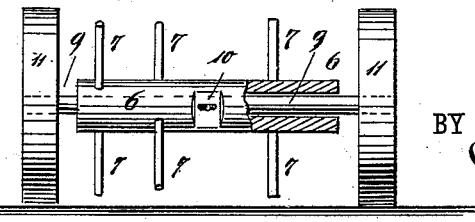

Figure 1, Sheet 1, is a plan view of my improvement. Fig. 2, Sheet 1, is a sectional side elevation of the same, taken through the line $x$ $x$, Fig. 1. Fig. 3, Sheet 1, is a plan view, partly in section, of the cotton-seed agitator. Fig. 4, Sheet 2, is an under side view of the improvement. Fig. 5, Sheet 2, is a side elevation of the same. Fig. 6, Sheet 2, is a rear view of the clod-crushing roller, showing a pulley and clutch connected with it.

The object of this invention is to promote convenience and secure efficiency in planting seeds and cultivating plants.

This invention has also the further object of saving farmers from the expense of buying a separate machine for each operation in raising crops planted in rows.

The invention relates to improvements in a combined harrow, seed-planter, and cultivator; and the invention consists in the peculiar construction and arrangement of the parts, as hereinafter more fully set forth, and pointed out in the claims.

A is the main or base frame of the machine, which is made V-shaped, and is formed of two inclined side bars connected at a little distance from their rear ends by a cross-bar. The forward ends of the side bars of the frame A nearly meet, and are hinged by a bolt, B, to the opposite sides of the tongue C, at a little distance from the rear end of the said tongue.

The harrow-frame D is made V-shaped, and of such a size as to fit loosely into and work freely in the space within the frame A. The harrow-frame D is formed of two inclined side bars connected at their rear ends, and at a little distance from their forward ends, by cross-bars.

To the cross-bars of the frame D, upon the opposite sides of and equally distant from their centers, are attached the ends of two parallel longitudinal bars, D'. The forward ends of the side bars of the frame D nearly meet, and are hinged by a bolt, E, to the opposite sides of the rear end of the tongue C.

To the upper and lower sides of the tongue C, in front of the forward end of the frame A, are clamped two cross-bars, F, by two bolts, G. The bolts G pass through the cross-bars F and across the opposite sides of the tongue C.

To the ends of the cross-bars F are swiveled the standards H, to the forked lower ends of which are journaled caster-wheels I to support the forward end of the machine and allow the said machine to be turned readily. The standards H are secured in place in the cross-bars F by pins J, passed through them above and below the lower cross-bar F, washers K being placed upon the said standards, between the lower side of the said lower cross-bar and the lower pin J to lessen the friction. Several holes are formed through the standards H to receive the pins J, so that by adjusting the said pins the machine can be lowered to bring the plows and harrow-teeth into working position, and can be raised to support the said plows and harrow-teeth out of contact with the ground for convenience in passing from place to place.

L are the harrow-teeth, the shanks of which pass through holes in the inclined side bars of the frame D, and have screw-threads formed upon them to receive the nuts M, placed one above and the other below the said side bars, so that by adjusting the said nuts the teeth L can be adjusted to work deeper or shallower in the ground, as may be required.

N is the plow that opens a furrow to receive the seed, and which is secured to the lower end of the standard O. The upper part of the standard O, or a long tenon formed upon the said standard, passes through a hole in the rear end of the tongue C, and has a screw-thread formed upon it to receive the two nuts P, placed one above and the other below the said tongue, so that by adjusting the said nuts the standard O can be adjusted to cause the plow N to work deeper or shallower in the ground, as may be desired.

To each of the longitudinal bars D' of the frame D are secured by bolts Q the upper ends of two standards, R, the forward standard R being placed at the inner side of the said bars D', and the rear standard being placed at the outer side. The standards R have plows S attached to their lower ends, and the draft-strain upon them is sustained by braces T, the lower ends of which are attached to the lower parts of said standards, and their upper ends are attached to the bars D'. Several holes are formed in the standards R and braces T to receive the fastening-bolts, so that the said standards and braces can be readily adjusted to cause the plows S to work deeper or shallower in the ground. The plows S are designed to cover the seed, and also to serve as cultivating-plows.

To the forward parts of the inclined side bars of the frame A, and to the end parts of the cross-bar of the said frame, are attached posts U, which are connected in pairs at the ends of the machine by cross-bars or rounds V, and are connected in pairs at the sides of the machine by the handles W. The rear ends of the handles W project into such a position that they can be readily reached and operated by the plowman from the rear of the machine for guiding the said machine.

To the lower parts of the outer sides of the four posts U are pivoted, at their angles, four elbow-levers, X, the lower arms of which are connected in pairs at the front and rear parts of the machine by rods Y. The rods Y are connected with the front and rear ends of the harrow-frame D. The upper arms of the elbow-levers, X, at the sides of the machine and at points equally distant from the pivots of the said levers, are connected by the connecting-bars Z. The upper arms of the rear elbow-levers X are extended upward, so that they can be readily reached and operated by the plowman to raise and lower the harrow-frame D and its attachments. The upwardly-projecting arms of the elbow-levers X pass through long keepers $a$, attached to the handles W, and cross the notched edges of catch-bars $b$, attached to the upper sides of the said handles, to hold the levers X, and with them the harrow-frame D, in any position into which they may be adjusted. By this construction it will be seen that the harrow-frame can be raised or lowered bodily by operating both levers X, or that one side of the harrow-frame can be raised or lowered independently of the other by operating one of the levers X, so that in cultivating side-hills the downhill side of the harrow-frame can be lowered, the uphill side remaining stationary, whereby all the teeth of the harrow will cultvate the soil to the same depth.

The rear part of the machine is supported upon wheels $c$, the outer journals of which revolve in bearings in the rear ends of the side bars of the frame A. The inner journals of the wheels $c$ are made long, and their ends revolve in bearings in the lower ends of hangers $d$, the upper ends of which are attached to a cross-bar, $e$. The cross-bar $e$ is attached at its ends to the upper ends of two posts, $f$, the lower ends of which are attached to the upper sides of the rear ends of the side bars of the frame A. The hangers $d$ are further strengthened in position by a cross-bar, $g$, attached to their middle parts, and the ends of which are attached to the posts $f$. The parts of the inner journals of the wheels $c$, next the said wheels, are made round to receive the loose pulleys $h$, and the parts of the said journals between the pulleys $h$ and the hangers $d$ are made square to receive the sliding clutches $i$, by means of which the pulleys $h$ are thrown into and out of gear with the wheels $c$. The clutches $i$ are provided with the ordinary grooves to receive the forked lower ends of the clutch-levers $j$. The clutches $i$ are held in gear with the pulleys $h$ by a spring, $k$, attached to and connecting the levers $j$ above their pivoting-points.

In case the soil is lumpy the wheels $c$ and the hangers $d$ are detached and replaced by the roller $l$, by which the lumps and clods are crushed. The journals of the roller $l$ are made in the same manner as the inner journals of the said wheels $c$ to receive the pulleys $h$ and clutches $i$, which in this case must be reversed to bring the clutch-teeth into the proper direction to give motion to the roller $l$. In this case the spring $k$ must be attached to the levers $j$ below their pivoting-points, as indicated in Fig. 6. The levers $j$ are held in either position by the notched catch-bars 15, attached to the upper side of the cross-bar $e$.

To the middle parts of the side bars of the frame A are attached upright blocks or frames $m$ to form a seat for the seed-box $n$, the projecting edges of the bottom of which are attached to the tops of the said blocks or frames $m$.

In the lower forward part of the seed-box $n$ is formed a discharge slot or opening, $o$, through which the seed escapes into the spout $p$, and is conducted to the ground in the rear of the opening-plow O N.

Within the seed-box $n$ is placed a box or frame, $q$, to which is attached a partition, $r$, dividing the said seed-box into two unequal compartments. In planting corn and other smooth seeds the seed is placed in the larger or rear compartment of the seed-box $n$, from which it is removed and discharged into the forward compartment to pass through the spout $p$ to the ground by cups $s$, attached to the endless belt $t$. The cups $s$ are made in the form of keepers, open at both ends, and have their rear or lower ends closed by blocks $u$, inserted in them and secured in place by set-screws $v$, or other equivalent means, so that by adjusting the said blocks $u$ the cups $s$ can be made to contain more or less seed, as may be required. The endless belt $t$ passes around and receives motion from two shafts, $w\, x$, which revolve in bearings in the rear lower part and the forward upper part of the sides of the seed-box $n$.

To the ends of the shafts $w\, x$ are attached pulleys $y\, z$, around which pass endless belts 1. The belts 1 pass around the pulleys $h$, connected with the wheels $c$ or roller $l$, and receive motion from the said wheels or roller. The lower parts of the belts 1 pass over long pulleys 2 to give the said parts of the belts such a direction as will give them a sufficient bearing upon the pulleys y. The long pulleys 2 are secured by split keys 3 or other suitable means to a shaft, 4, which revolves in bearings in the rear posts U and in the post 5, placed midway between the said posts U. The lower end of the center post, 5, is attached to the center of the cross-bar of the frame A, and its upper end is attached to the center of the rear cross-bar or round, V. The post 5 supports the center of the shaft 4 and keeps the adjacent ends of the pulleys 2 from contact with each other.

When the machine is to be used for planting cotton the pulleys y z, the shafts w x, the endless belt t, and the frame q are removed. The tubular shaft 6, provided with radial arms 7, is placed within the middle part of the seed-box n, with its ends directly opposite the openings or bearings 8 in the middle parts of the sides of the said seed-box. The shaft 9 is then passed through the bearings 8 and through the interior of the tubular shaft 6, and the said tubular shaft is secured to it by a split key, 10, or other suitable means. Pulleys 11 are attached to the ends of the shaft 9 to receive the driving-belts 1, the said pulleys 11 being made of such a size as to take the same length of belts as the pulleys y z, so that the said belts can be used without change with either arrangement. Around the long pulleys 2 pass the endless belts 12, which pass beneath the bottom of the seed-box n, and pass around a shaft, 13, journaled to the lower parts of the forward posts U. To the center of the shaft 13 is attached a toothed wheel, 14, which passes in through the discharge-opening o of the seed-box n, so as to take hold of the cotton-seeds, draw them out, and drop them into the conducting-spout p. The teeth of the wheel 14 are made with their forward sides short and radial and their rear sides long and inclined to adapt them to take hold of the cotton-seeds and draw the said seeds out of the seed-box, the stirrer 6 7 9 keeping the said seeds loose, so that they will readily pass down to the wheel 14.

To the center of the cross-bar e, or to a support attached to the said cross-bar, is attached the driver's seat 16.

With this construction the soil can be loosened, the seed planted, and the plants cultivated by using a single machine.

Having thus described my invention, what I claim as new, and desire to secure by Letters Patent, is—

1. In a combined harrow, seed-planter, and cultivator, the combination of the V-shaped base-frame A, slotted at its forward end, and adjustable V-shaped harrow-frame D, hung loosely within the frame A, and having a slot in its forward end, and provided with the harrow-teeth L, and longitudinal bars D', carrying the standards and plows R S, seed-box n, and tongue C, pivoted in the slots of the frames A D by the bolts B E, and carrying the adjustable standard and plow O N, substantially as described, and for the purpose set forth.

2. The combination, with the V-shaped base-frame A, slotted at its forward end, and adjustable V-shaped harrow-frame D, hung loosely within the frame A, and having a slot in its forward end, and provided with the harrow-teeth L, and longitudinal bars D', carrying the standards and plows R S, of the tongue C, pivoted in the slots of the frames A D by bolts B E, cross-bars F, bifurcated adjustable standards H, provided with a series of holes near their lower ends and journaled in the cross-bars, removable pins J, inserted in the holes of the standards above and below the lower cross-bar F, and caster-wheels I, substantially as described, and for the purpose set forth.

3. In a combined harrow, seed-planter, and cultivator, the combination, with the seed-box n, the separable frame q, having partition r, and a driving mechanism, of the two shafts w x, the endless belt t, and the seed-cups s u, substantially as herein shown and described, whereby the seed is raised from the rear compartment of the said seed-box and discharged into the other compartment to pass through the conductor-spout to the ground, as set forth.

4. The combination, with the seed-box n, provided with the slot o in its bottom and forward end, and movable frame q, fitting closely in the interior of the box n, and having a partition, v, of the shafts w x, belt t, having the cups u, feed-wheel 14, and mechanism, substantially as set forth, for operating the belt t and feed-wheel 14, substantially as described, and for the purpose set forth.

ROBERT F. ELLIS.

Witnesses:
JOHN BEVERLEY,
W. H. RICH.